(12) United States Patent
Ooishi

(10) Patent No.: US 7,564,490 B2
(45) Date of Patent: Jul. 21, 2009

(54) NOISE REDUCTION APPARATUS, METHOD AND PROGRAM

(75) Inventor: Makoto Ooishi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 748 days.

(21) Appl. No.: 11/202,068

(22) Filed: Aug. 12, 2005

(65) Prior Publication Data
US 2006/0039039 A1 Feb. 23, 2006

(30) Foreign Application Priority Data
Aug. 23, 2004 (JP) .............................. 2004-242133

(51) Int. Cl.
*H04N 5/217* (2006.01)

(52) U.S. Cl. ................... 348/241; 348/272; 382/162; 382/164; 382/275

(58) Field of Classification Search ................ 348/241, 348/272; 358/463; 382/162, 164, 275
See application file for complete search history.

(56) References Cited

U.S. PATENT DOCUMENTS

| 5,892,540 | A * | 4/1999 | Kozlowski et al. .......... 348/300 |
| 7,103,214 | B2 | 9/2006 | Kusakabe et al. |
| 7,308,152 | B2 * | 12/2007 | Ito ................................ 382/260 |
| 2004/0001621 | A1 | 1/2004 | Kusakabe et al. |
| 2005/0073592 | A1 * | 4/2005 | Aotsuka ..................... 348/224.1 |
| 2005/0099515 | A1 | 5/2005 | Tsuruoka |
| 2006/0038899 | A1 * | 2/2006 | Tamaru et al. .............. 348/241 |
| 2006/0088211 | A1 | 4/2006 | Kusakabe et al. |

FOREIGN PATENT DOCUMENTS

| JP | 4-235472 A | 8/1992 |
| JP | 11-146410 A | 5/1999 |
| JP | 2002-222416 A | 8/2002 |
| JP | 2004-40235 A | 2/2004 |
| JP | 2004-54884 A | 2/2004 |
| JP | 2004-88149 A | 3/2004 |
| JP | 2004-187203 A | 7/2004 |

* cited by examiner

*Primary Examiner*—David L Ometz
*Assistant Examiner*—Quang V Le
(74) *Attorney, Agent, or Firm*—Birch, Stewart, Kolasch & Birch, LLP

(57) ABSTRACT

Uncorrelated noise is reduced in image data. To achieve this, CCD-RAW data, in which color components are output in order in accordance with an array of color filters that have been formed on the photoreceptor surface of a CCD, is subjected to array conversion processing in such a manner that the data is divided into its color components. Image data indicating pixels within a noise-reduction target area of 5×5 pixels is extracted from the CCD-RAW data obtained by the array conversion. A filter for reducing uncorrelated noise is calculated and a filtering operation is performed using the calculated filter while the correlativity of the CCD-RAW data is maintained. These processing steps are repeated with regard one frame of the CCD-RAW data.

17 Claims, 18 Drawing Sheets

IF UNCORRELATED NOISE IS ABSENT

IF UNCORRELATED NOISE IS PRESENT

AT TIME OF COORDINATE SHIFT / FILTERING

IF CORRELATIVITY IS ABSENT

NOISE REDUCTION APPARATUS, METHOD AND PROGRAM

BACKGROUND OF THE INVENTION

1. Field of the Invention

This invention relates to a noise reduction apparatus and method and to a noise reduction program.

2. Description of the Related Art

CCDs used in digital still cameras are continuing to be improved in terms of number of pixels and sensitivity. The influence of noise, therefore, has become a problem.

Use of a low-pass filter or median filter, etc., to remove noise from a video signal obtained by sensing an image has been considered (see the specification of Japanese Patent Application Laid-Open No. 4-235472). Further, the removal of noise from an image without detracting from image sharpness also has been considered (see the specification of Japanese Patent Application Laid-Open No. 2002-222416).

It is still difficult, however, to remove noise completely.

SUMMARY OF THE INVENTION

Accordingly, an object of the present invention is to reduce noise.

According to the present invention, the foregoing object is attained by providing a noise reduction apparatus comprising: a color-component extraction device (color-component extraction means) for inputting image data representing an image in which each pixel of a number of pixels constituting one frame of an image has one color component from among a plurality of color components, the color components having a distribution that is systematic, and extracting, on a per-color-component basis, color image data representing a pixel within a zone in which the color image data is regarded as having correlativity; a noise removal device (noise removal means) for removing uncorrelated noise, which is contained in the color image data that has been extracted on a per-color-component basis, while maintaining correlativity of the color image data that has been extracted by the color-component extraction device on a per-color-component basis; and a control device for exercising control in such a manner that color-component extraction processing by the color-component extraction device and noise removal processing by the noise removal device is repeated with regard to the one frame of color image data.

The present invention also provides a method suited to the noise reduction apparatus described above. Specifically, the present invention provides a noise reduction method comprising the steps of: inputting image data representing an image in which each pixel of a number of pixels constituting one frame of an image has one color component from among a plurality of color components, the color components having a distribution that is systematic, and extracting, on a per-color-component basis, color image data representing a pixel within a zone regarded as having correlativity; removing uncorrelated noise, which is contained in the color image data that has been extracted on a per-color-component basis, while maintaining correlativity of the color image data that has been extracted on a per-color-component basis; and repeating the color-component extraction processing and noise removal processing with regard to the one frame of color image data.

The present invention also provides a program for implementing the noise reduction processing described above.

In accordance with the present invention, uncorrelated noise is removed from image data representing an image in which each pixel of a number of pixels constituting one frame of an image has one color component from among a plurality of color components, the color components having a systematic distribution. Since such image data is data that prevails prior to application of interpolation processing (processing for generating a color component that does not exist among the plurality of color components), it is possible to implement noise reduction processing without dependence upon circuit structure, such as a signal processing circuit used after interpolation processing, in comparison with a case where noise removal processing is executed after interpolation processing.

The apparatus may further comprise a noise removal processing inhibiting device (noise removal processing inhibiting means) for inhibiting noise removal processing by the noise removal device in accordance with the level of the color image data.

The color-component extraction device inputs color image data that is output from a single-chip solid-state electronic image sensing device in which a number of optoelectronic transducers are arrayed, color filters each having a characteristic that passes light of one color component from among the plurality of color components being formed systematically, for each of the plurality of colors, on photoreceptor surfaces of respective ones of the optoelectronic transducers of the number of optoelectronic transducers.

It may be so arranged that processing for removing uncorrelated noise in the noise removal device is executed based upon at least one of the characteristic of the solid-state electronic image sensing device and shooting information used when a picture has been taken using the solid-state electronic image sensing device.

The noise removal device includes a color image data shifting device (color image data shifting means) for shifting the level of the color image data, which has been extracted by the color-component extraction device, in such a manner that an average value of the levels of the color image data that has been extracted by the color-component extraction device will become an origin position of color space of the plurality of color components; a filtering device (filtering means) for subjecting the color image data that has been shifted by the color image data shifting device to processing for removing uncorrelated noise in accordance with the level of this color image data; and a color image data reverse shifting device for returning, in accordance with the amount of shift, the level of the color image data from which the uncorrelated noise has been removed by the filtering device.

Thus, uncorrelated noise can be removed while the correlativity of the color image data is maintained.

The noise reduction processing in the filtering device may be digital filtering processing that utilizes calculation conforming to the number of the plurality of color components.

Further, the noise reduction processing in the filtering device may be digital filtering processing for handling the plurality of color components in such manner that the number of the plurality of color components will become less than the number of original color components, this processing utilizing calculation conforming to the number of the plurality of color components. The amount of calculation involved in digital filtering processing can be reduced.

The apparatus may further comprise a noise reduction processing halting device (noise reduction processing halting means) for halting noise reduction processing in a case where calculation in the digital filtering processing has diverged.

Digital filtering processing applied to the shifted color image data in the filtering device uses processing that subtracts uncorrelated noise from image data in an area that contains uncorrelated noise, by way of example.

The apparatus may further comprise an image data dividing device (image data dividing means) for dividing the entirety of the color image data that has been extracted by the color-component extraction device into a plurality of color image data groups exhibiting correlativity with one another. In this case, the color image data shifting device would perform the shift with regard to a color image data group, which contains color image data that is to undergo removal of uncorrelated noise, from among the plurality of color image data groups obtained by division by the image data dividing device, in such a manner that this color image data group will occupy the origin position of the color space of the plurality of color components. An image represented by color image data that has undergone noise reduction processing can be prevented from being degraded owing to use of image data that has no correlativity.

The image data dividing device includes a small-block dividing device (small-block dividing means) for dividing color image data that has been extracted by the color-component extraction device into a plurality of small blocks. In this case, the color image data is divided into a plurality of correlated color image data groups per each of the plurality of small blocks obtained by division by the small-block dividing device.

It may be so arranged that the color image data is divided into a plurality of correlated color image data groups per each of the plurality of small blocks based upon representative pixels that constitute the small blocks.

The apparatus may further comprise an uncorrelated noise halting control device (uncorrelated noise halting control means) for halting processing for removing uncorrelated noise by the uncorrelated noise removing device in a case where the size of an image represented by the plurality of color image data groups obtained by division by the image data dividing device is less than a first predetermined value.

In a case where the size of an image area represented by the plurality of color image data groups is equal to or greater than a second predetermined value larger the first predetermined value, the shift may be performed with regard to a color image data group, which contains color image data that is to undergo removal of uncorrelated noise, from among the plurality of color image data groups obtained by division by the image data dividing device.

The apparatus may further comprise a luminance data generating device (luminance data generating means) for generating luminance data from the color image data that has been extracted by the color-component extraction device. In this case, the color image data dividing device would divide the color image data into a plurality of luminance data groups, which exhibit correlativity with one another, from among the luminance data that has been generated by the luminance data generating device. The amount of calculation can be reduced in this case as well.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a flowchart illustrating processing for area discrimination and the like;

DESCRIPTION OF THE PREFERRED EMBODIMENT

A preferred embodiment of the present invention will now be described in detail with reference to the drawings.

The principles of noise reduction processing according to a preferred embodiment of the invention will be described first.

Figure 1:
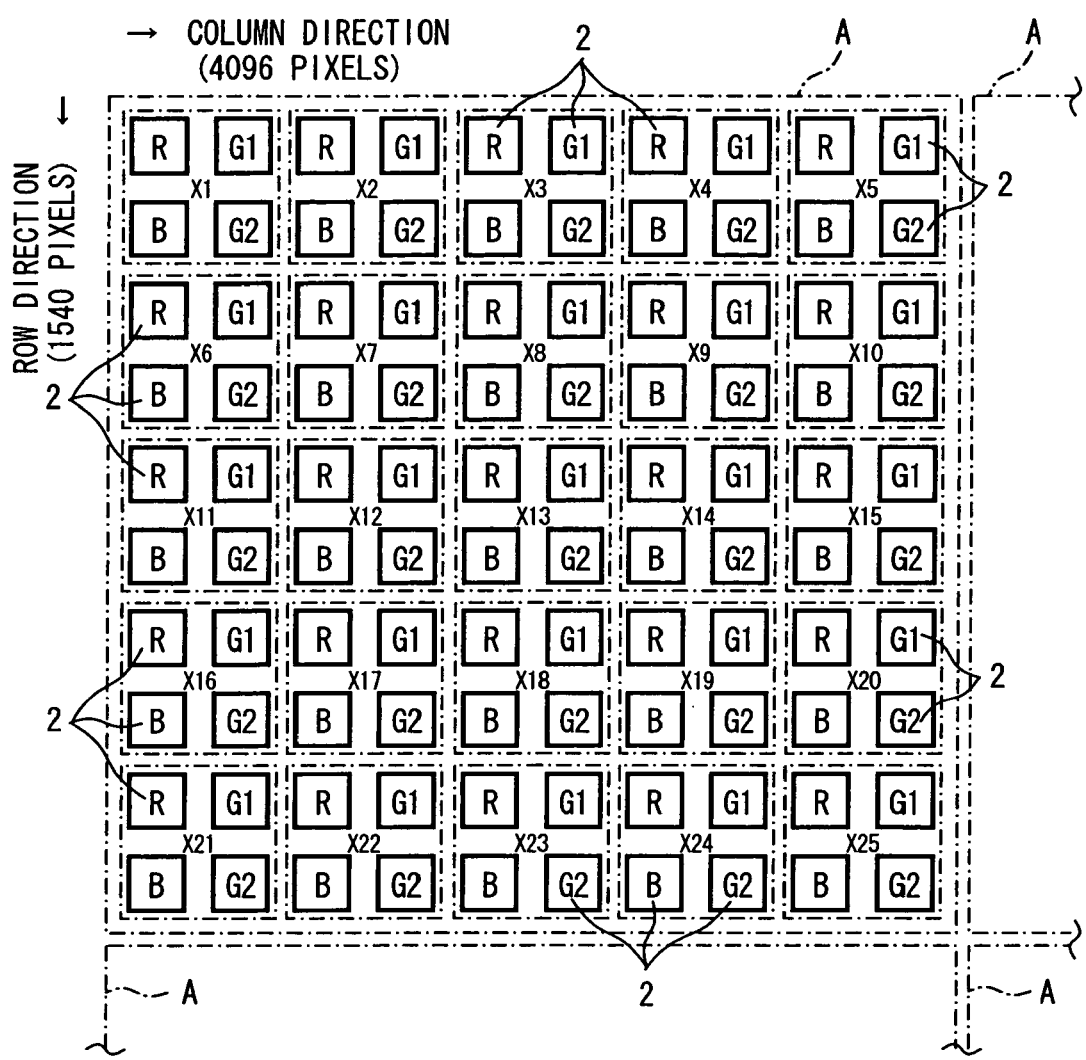
FIG. 1 illustrates part of the photoreceptor surface of a CCD.

FIG. 1 illustrates part of the photoreceptor surface of a CCD 1 used in a digital still camera according to this embodiment.

Here 4096 photodiodes 2 are disposed in the column direction of the CCD 1 and 1540 photodiodes 2 in the row direction. Accordingly, image data representing the image of a subject composed of 4096 pixels in the column direction and 1540 pixels in the row direction is obtained by sensing the image of the subject using the CCD 1. The image data obtained from each photodiode 2 corresponds individually to each pixel of the image.

Formed on the photoreceptor surface of each photodiode 2 of the multiplicity thereof is a color filter having a characteristic that passes any one color component among a plurality of color components, namely a red color component, blue color component, first green color component and second green color component (the first and second green color components may have identical characteristics). The filters that pass the red color component, blue color component, first green color component and second green color component have been assigned the characters "R", "B", "G1" and "G2", respectively.

The filters that pass the red light component and the filters that pass the blue light component are formed alternately on the photoreceptor surfaces of the photodiodes 2 in odd-numbered rows. The filters that pass the first green light component and the filters that pass the second green light component are formed alternately on the photoreceptor surfaces of the photodiodes 2 in even-numbered rows.

In this embodiment, noise reduction processing is executed using an area (a noise-reduction target area A), which is composed of ten photodiodes 2 in each of the column and row directions, as a single unit. Although the physical positions (spatial positions) of four photodiodes 2 that adjoin one another in the column and row directions are different, these physical positions are regarded as being the same in this embodiment. Four pixels that correspond to four photodiodes 2 are handled as one set (though it goes without saying that the number of pixels handled as a set need not necessarily be four). The noise-reduction target area A contains 25 of these sets (X1 to X25) of photodiodes 2.

When the image of the subject is sensed using such a CCD 1, the CCD 1 outputs CCD-RAW data representing the image of the subject. The CCD-RAW data is such that items of data having color components that are in accordance with the color filters that have been formed on the photoreceptor surfaces of the photodiodes 2 appear serially one row's worth at a time. A pixel is represented by data of any one color component, namely the red color component, blue color component, first green color component or second green color component; it does not possess data of another color component. Data of another color component is interpolated by color interpolation processing.

Figure 2:
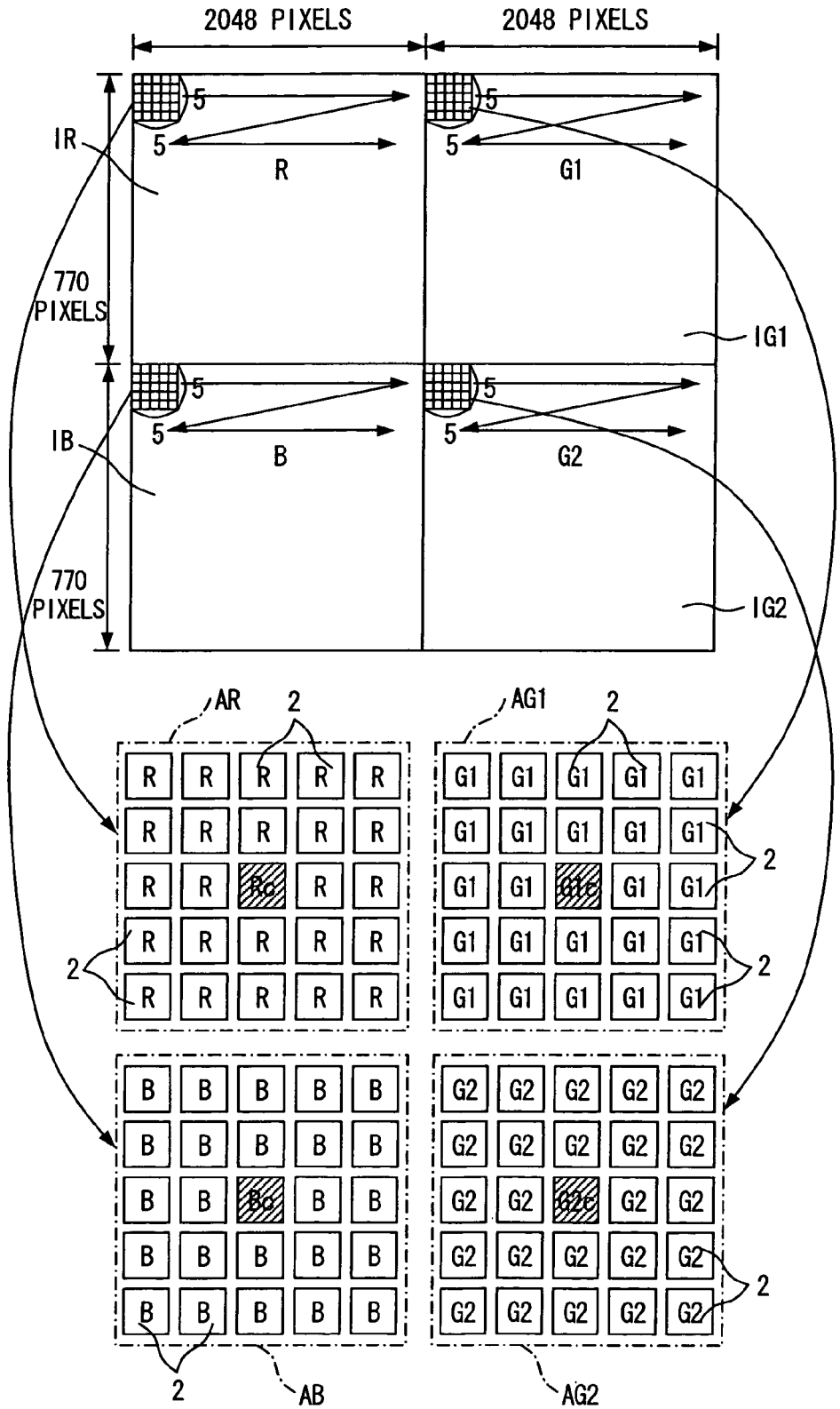
FIG. 2 illustrates arrays of pixels after division according to color.

FIG. 2 illustrates how an image looks after execution of color-component division processing.

In this embodiment, color-component extraction processing (color-component division processing) of CCD-RAW data is executed in such a manner that an array of pixels (this pixel array corresponds to the array of photodiodes 2 in FIG. 1) of an image represented by the CCD-RAW data that has been output from the CCD 1 in the manner described above will represent an image that has been divided on a per-color-component basis.

The image represented by this image data after it has been subjected to color-component division processing has 4096 pixels in the column direction and 1540 pixels in the row direction, as described above. The image after division into color components can be divided into an upper-left area, lower-left area, upper-right area and lower-right area on a per-color-component basis. All of these areas have 2048 pixels in the column direction and 770 pixels in the row direction.

The upper-left area, lower-left area, upper-right area and lower-right area are image portions IR, IG, IG1 and IG2 represented by the image data of the red color component, blue color component, first green color component and second green color component, respectively.

Areas of five pixels in each of the column and row directions in each of these image portions IR, IB, IG1 and IG2 become noise-reduction target areas AR, AB, AG1 and AG2, respectively. The noise-reduction target areas AR, AB, AG1 and AG2 in combination correspond to the noise-reduction target area shown in FIG. 1, as mentioned above.

Pixels Rc, Bc, G1c and G2c at the centers of the noise-reduction target areas AR, AB, AG1 and AG2, respectively, are pixels that are to undergo noise reduction. As will be described later in greater detail, noise reduction processing of the central pixels Rc, Bc, G1c and G2c is executed utilizing the pixels (image data) present in the noise-reduction target areas AR, AB, AG1 and AG2. When noise reduction processing of the central pixels Rc, Bc, G1c and G2c of the noise-reduction target areas AR, AB, AG1 and AG2, respectively, ends, the noise-reduction target areas AR, AB, AG1 and AG2 are each shifted one pixel to the right and noise reduction processing is applied to the pixels Rc, Bc, G1c and G2c located at the centers of respective ones of the noise-reduction target areas AR, AB, AG1 and AG2 thus shifted. Shifting of the noise-reduction target areas and noise reduction processing are thus repeated for one frame of the image.

As mentioned above, the positions of four pixels adjoining one another in the column and row directions in the CCD 1 differ physically but the pixels are regarded as being at the same position in this embodiment. This means that a pixel within the noise-reduction target areas AR, AB, AG1 and AG2 can be expressed by $Xn=(Rn, Gn, Bn, G2n)$. (Since the pixels within the noise-reduction target areas AR, AB, AG1 and AG2 are 25 in number, n=1 to 25 holds.)

FIGS. 3 to 6 illustrate the relationship between color space of the red, blue, first green and second green color components and image data representing a pixel in a noise-reduction target area.

Figure 3:
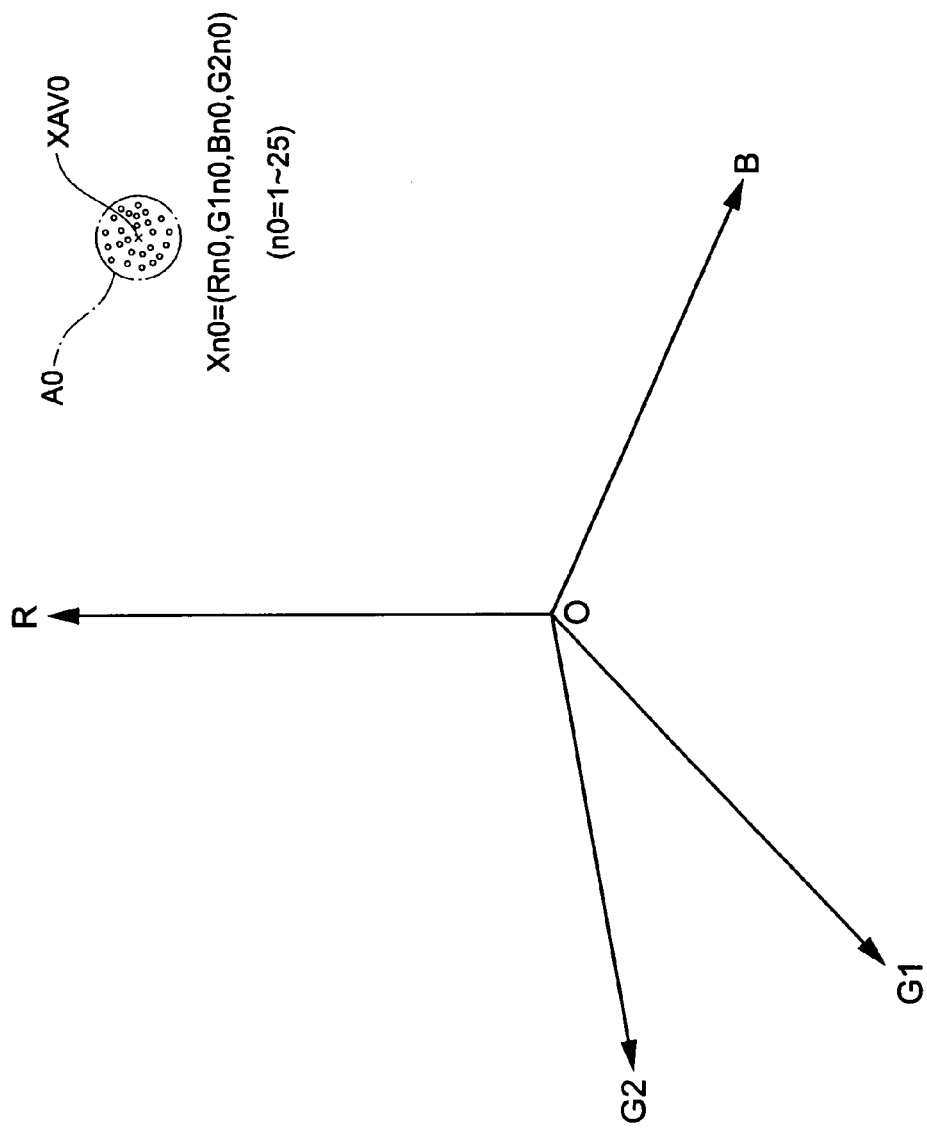
FIGS. 3 to 6 illustrate the relationship between color space and image data.

FIG. 3 illustrates the relationship between the color space and image data representing a pixel in a noise-reduction target area A0 in a case where there is no uncorrelated noise.

The noise-reduction target area A0 is regarded as one having correlativity. Image data representing a pixel $Xn0=(Rn0, G1n0, Bn0, G2n0)$ within the noise-reduction target area A0, therefore, falls within bounds in which the levels of the image data are comparatively consolidated. Average data of pixel $Xn0$ within the noise-reduction target area A0 is indicated by XAV0.

Figure 4:
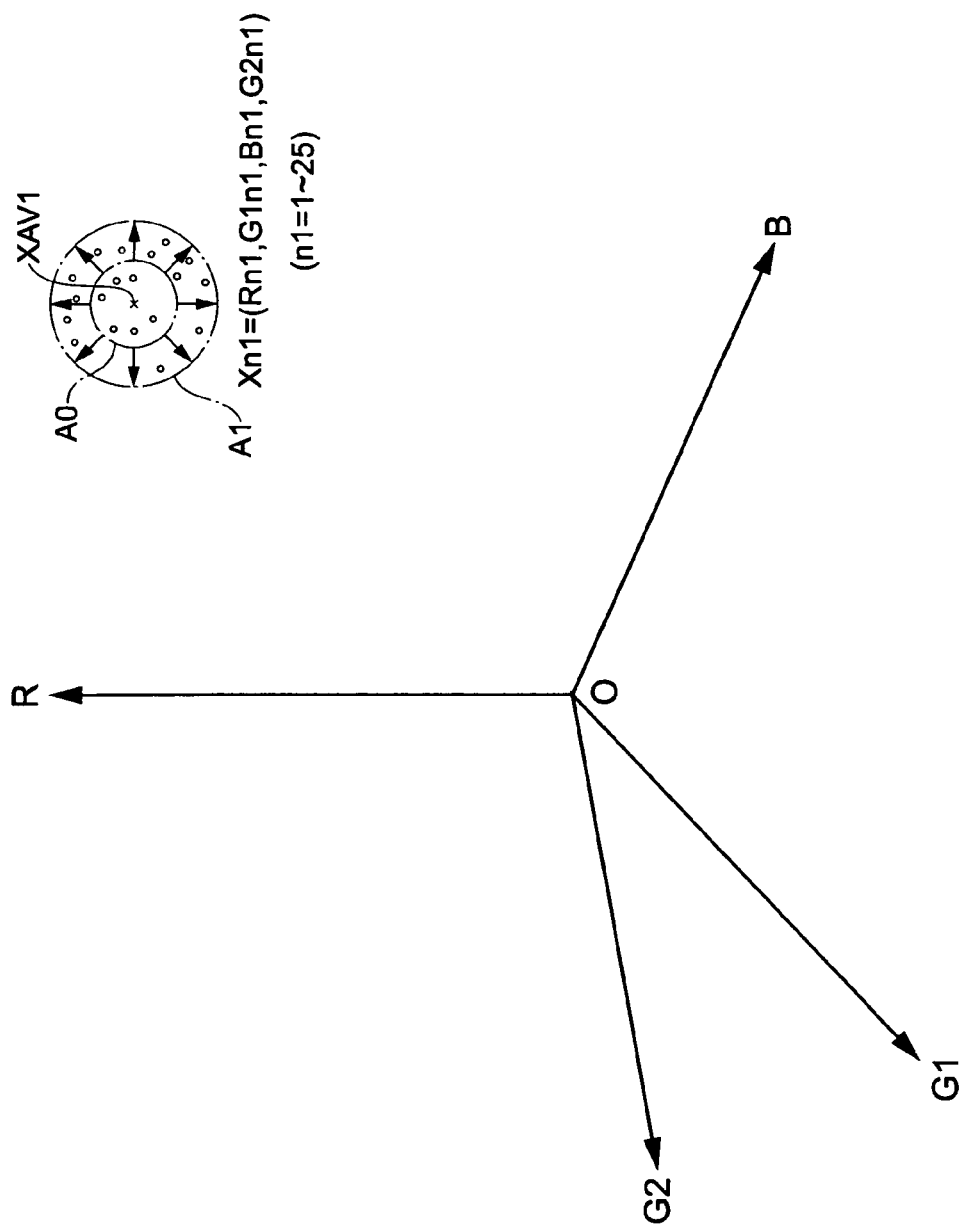

FIG. 4 illustrates the relationship between the color space and image data representing a pixel in a noise-reduction target area A1 in a case where uncorrelated noise is present. The noise-reduction target area A0 for the case where there is no uncorrelated noise also is illustrated for the purpose of comparison.

In a case where uncorrelated noise is present, image data representing a pixel $Xn1=(Rn1, G1n1, Bn1, G2n1)$ within the noise-reduction target area A1 is such that the levels of the image data representing each of the pixels are dispersed owing to the uncorrelated noise. Consequently, the zone of the image data representing pixels in the noise-reduction target area A1 in a case where uncorrelated noise is present is broader than the zone of image data representing pixels in the noise-reduction target area A0 in a case where uncorrelated noise is absent. Further, the average data of pixel $Xn0$ in the noise-reduction target area A1 is indicated by XAV1.

Noise reduction processing according to this embodiment eliminates uncorrelated noise.

Figure 5:
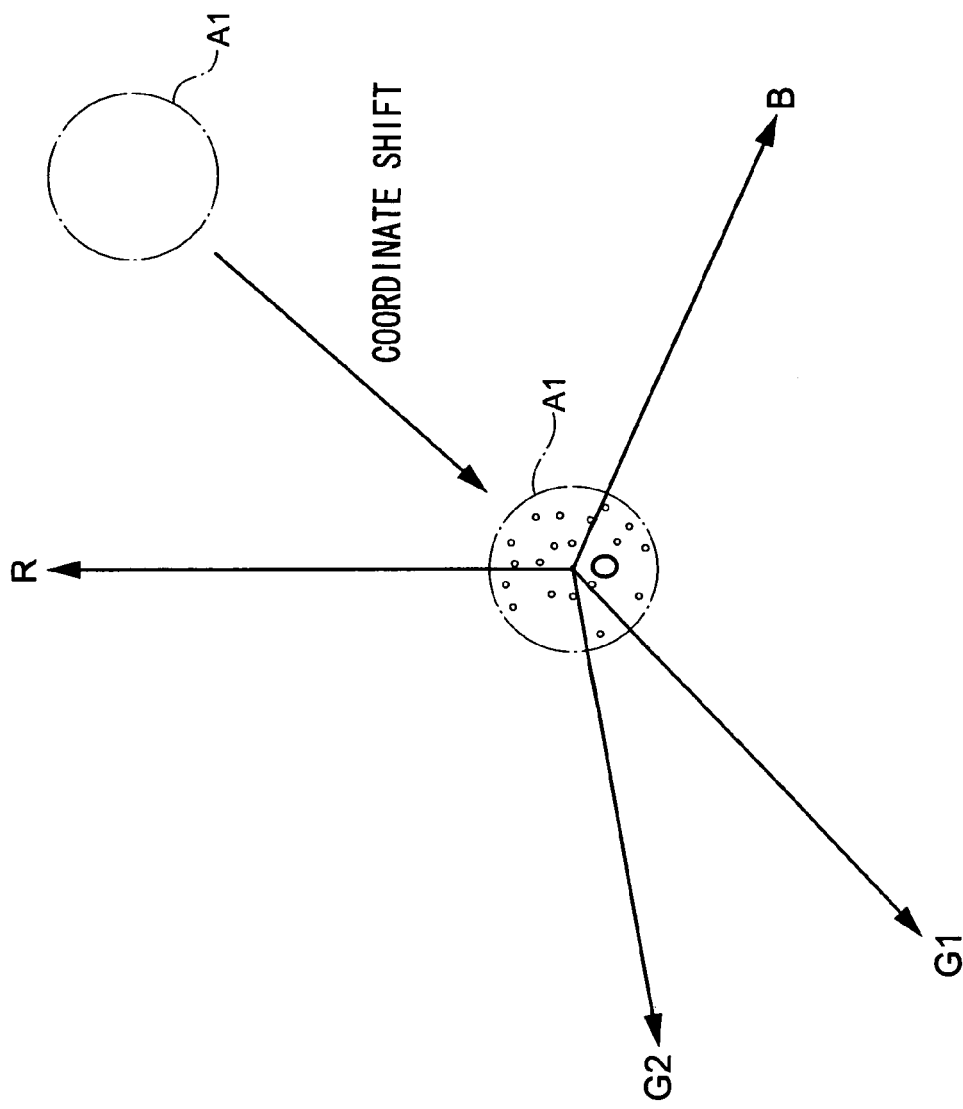

FIG. 5 illustrates the relationship between the color space and image data representing a pixel in the noise-reduction target area A1 at the time of movement of image-data coordinates and filtering for removal of noise.

In a case where noise reduction is executed in this embodiment, all of the image data representing pixel $Xn1$ in noise-reduction target area A1 undergoes a coordinate shift (level shift) in such a manner that the level of the average data XAV1 of pixel $Xn1$ in noise-reduction target area A1 will become the origin of the color space. Filtering serving as noise reduction processing is applied to the image data representing the pixel $Xn1$ in the noise-reduction target area A1 in a state in which all of the image data representing pixel $Xn1$ in noise-reduction target area A1 has undergone a coordinate shift in such a manner that the average data $Xn1$ is shifted to the origin position. Since filtering is applied with the average data XAV1 as the position of the origin, comparatively appropriate filtering can be performed.

Figure 6:
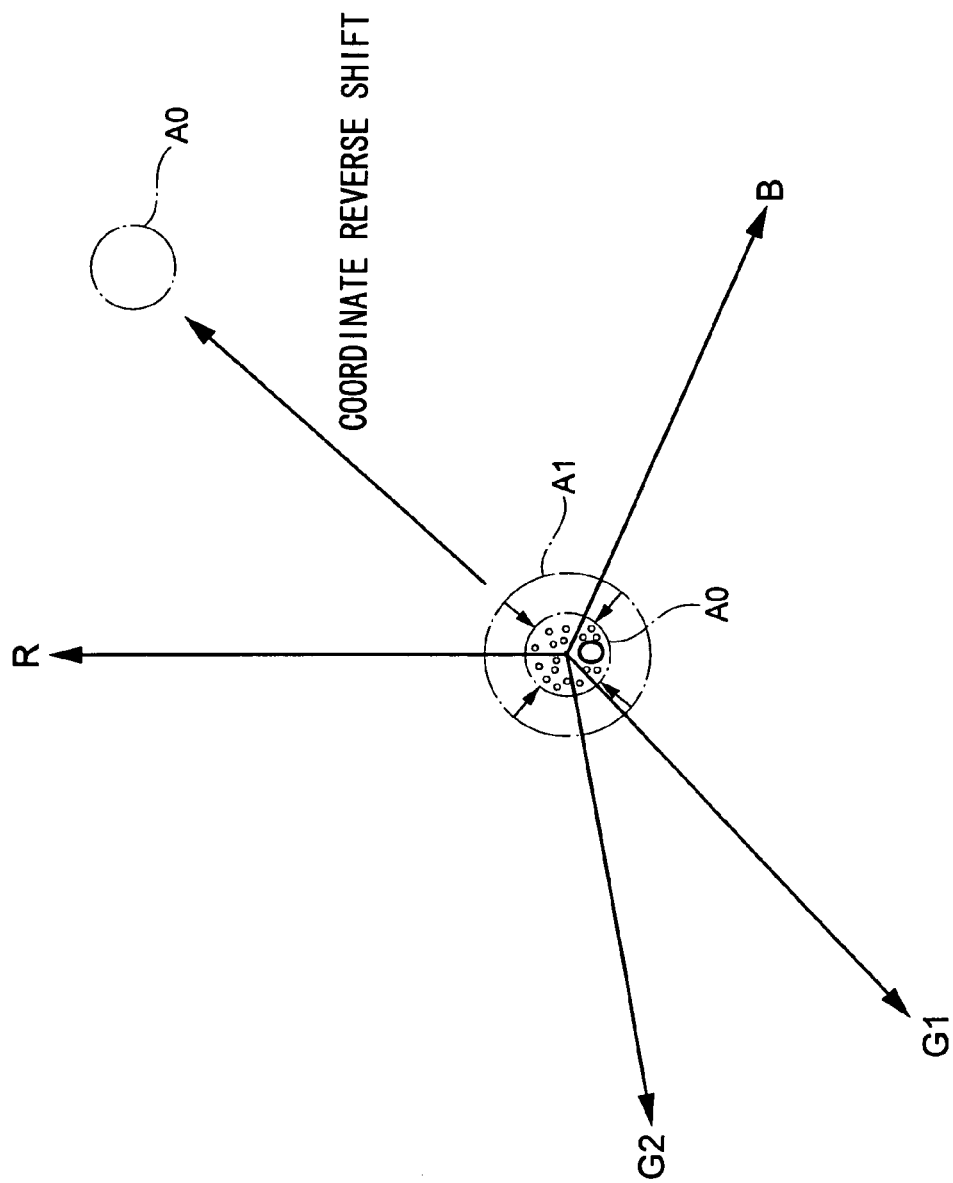

FIG. 6 illustrates the relationship between the color space and image data representing a pixel in the noise-reduction target area A1 at the time of reverse movement of image-data coordinates.

The above-described filtering processing eliminates uncorrelated noise. Owing to this filtering processing, the zone of image data representing a noise-reduction target pixel within the noise-reduction target area A1 falls within (approaches) the zone of image data representing a pixel within the noise-reduction target area A0 in a case where there is no uncorrelated noise. By repeating similar processing also with regard to the remaining pixels in the noise-reduction target area A1, all of the pixels in the noise-reduction target area A1 fall within (approach) the zone of the image data representing pixels in the noise-reduction target area A0.

When the image data representing the pixel Xn1 in the noise-reduction target area A1 is subjected to filtering as noise reduction processing in a state in which all of the image data representing the pixel Xn1 in the noise-reduction target area A1 has had its coordinates shifted, as mentioned above, a coordinate reverse-shift (a level reverse-shift) is performed in such a manner that the average data XAV1 returns to the position that prevailed prior to the shift of coordinates. Noise reduction processing is thus completed.

Figure 7:
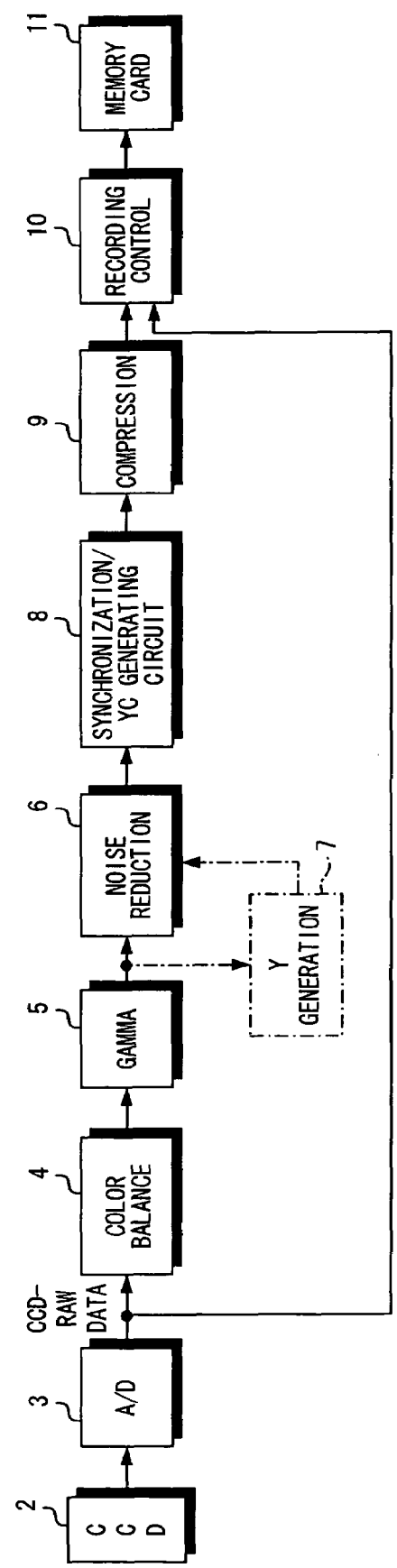
FIG. 7 is a block diagram illustrating the electrical structure of a digital still camera.

FIG. 7 is a block diagram illustrating the electrical structure of a digital still camera in which the above-described noise reduction processing is executed.

By sensing the image of a subject, a video signal is output from the CCD 1 as described above and is input to an analog/digital converting circuit 3. The latter outputs the above-mentioned CCD-RAW data.

In a case where CCD-RAW recording has been set by a recording mode switch (not shown), the CCD-RAW data that has been output from the analog/digital converting circuit 3 is input to a recording control circuit 10. The CCD-RAW data is recorded on a memory card 11 by the recording control circuit 10.

In a case where recording of compressed data has been set by the recording mode switch, the CCD-RAW data that has been output from the analog/digital converting circuit 3 is input to a color balance adjustment circuit 4 and is subjected to a color balance adjustment. The CCD-RAW data that has undergone the color balance adjustment is subjected to a gamma correction in a gamma correction circuit 5 and is then input to a noise reduction circuit 6.

The noise reduction circuit 6 executes noise reduction based upon the above-described principle. The noise reduction processing in noise reduction circuit 6 will be described later in greater detail.

The image data that has been output from the noise reduction circuit 6 is input to a synchronization/YC generating circuit 8. The latter executes synchronization processing for generating image data of a color component that does not exist in the image data representing the image and executes processing for generating luminance data and color difference data. The generated luminance data and color difference data is compressed in a compression circuit 9. The compressed luminance data and color difference data is recorded on the memory card 11 by the recording control circuit 10.

Further, a luminance data generating circuit 7 may be provided in order to generate luminance data from the CCD-RAW data output from the gamma correction circuit 5 and apply noise reduction processing using the generated luminance data. Noise reduction processing utilizing luminance data will be described later in greater detail (see FIGS. 14 and 15).

The amount of noise used in noise reduction processing will be described before the details of noise reduction processing.

Figure 8:
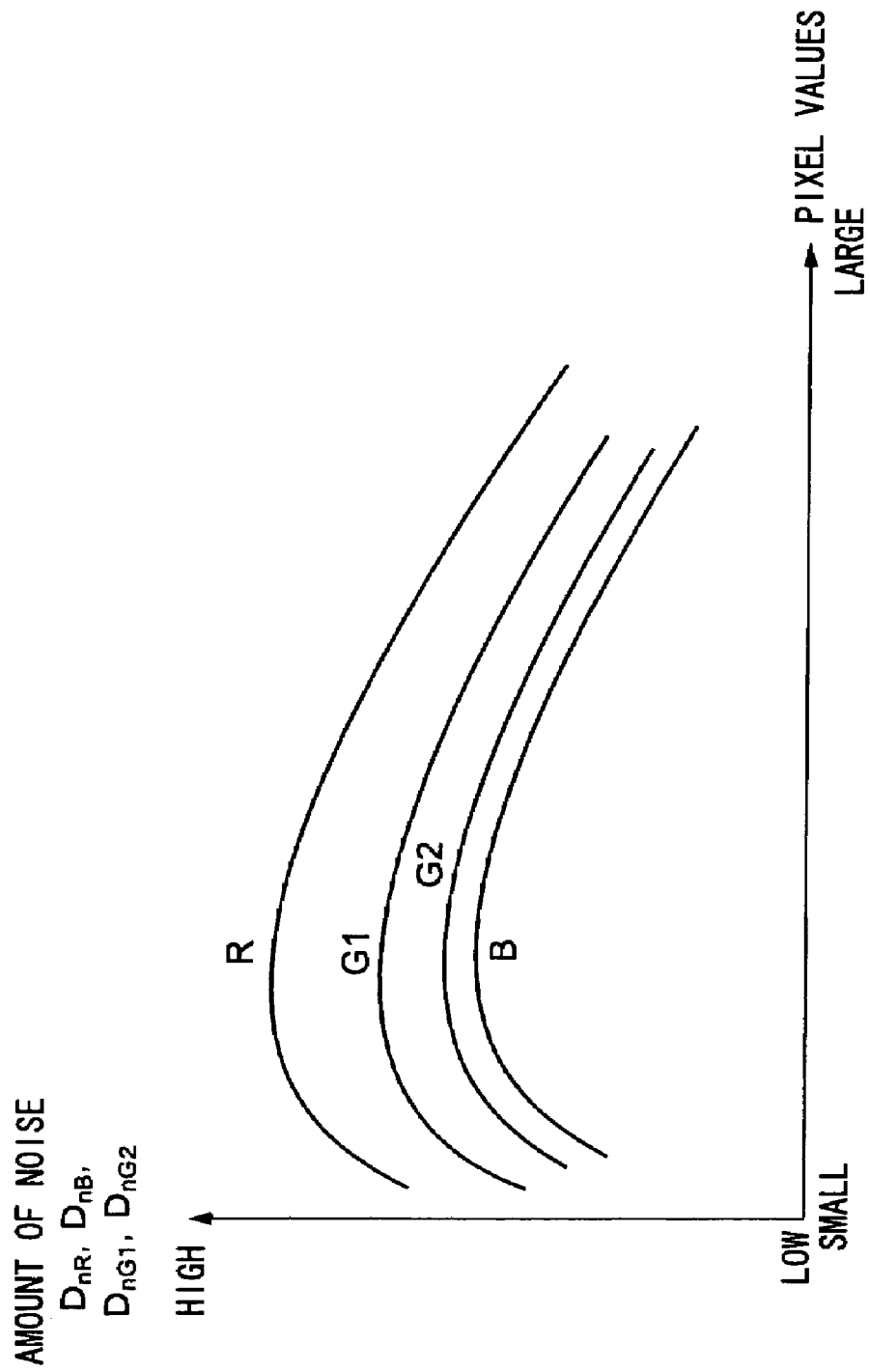
FIG. 8 illustrates the relationship between standard deviation of noise and pixel values.

FIG. 8 illustrates the relationship between amount of noise used in noise reduction processing and pixel values.

In noise reduction processing according to this embodiment, the image of a prescribed reference subject is sensed and an amount Dn of noise is analyzed in advance for every pixel level of each of a red color component, blue color component, first green color component and second green color component.

As the pixel levels of the red color component, blue color component, first green color component and second green color component become greater, noise amounts $D_{nR}$, $D_{nB}$, $D_{nG1}$ and $D_{nG2}$ of these color components, respectively, increase and peak at certain values. If the pixel values increase further, then the noise amounts $D_{nR}$, $D_{nB}$, $D_{nG1}$ and $D_{nG2}$ gradually decrease.

This relationship between the noise amounts $D_{nR}$, $D_{nB}$, $D_{nG1}$ and $D_{nG2}$ and pixel levels of each of the color components is analyzed beforehand and stored. The stored noise amounts $D_{nR}$, $D_{nB}$, $D_{nG1}$ and $D_{nG2}$ are utilized in noise reduction processing, described later.

Although the above-mentioned noise amounts $D_{nR}$, $D_{nB}$, $D_{nG1}$ and $D_{nG2}$ can also be utilized as is, gain WBG of the color balance adjustment circuit 4 may be utilized. A noise amount $D_{nG1}(\gamma)$ in a case where the gain WBG of the color balance adjustment circuit 4 is utilized is represented by the Equation (1) below.

$$D_{nG1}(\gamma) = D_{nG1} \times [WBG]^{\gamma} \quad \text{Equation (1)}$$

In Equation (1), the gain WBG of color balance adjustment circuit 4 is multiplied by γ because CCD-RAW data following a γ conversion is subjected to noise reduction processing in this embodiment. It goes without saying that in a case where noise reduction processing is applied to CCD-RAW data prior to the γ conversion, gain WBG not multiplied by γ is utilized. The noise amount $D_{nG2}(\gamma)$ of the second green color component also is obtained in similar fashion. In a case where noise reduction processing is applied to CCD-RAW data before the color balance adjustment, it will suffice to use the noise amount $D_{nG1}$ itself.

The noise amounts $D_{nB}(\gamma)$ and $D_{nR}(\gamma)$ of the blue and red color components are represented by Equations (2) and (3) below, in which [WBG] in Equation (1) has been replaced by [WBG(R/G)] and [WBG(B/G)], respectively.

$$D_{nR}(\gamma) = D_{nR} \times [WBG(R/G)]^{\gamma} \quad \text{Equation (2)}$$

$$D_{nB}(\gamma) = D_{nB}(\gamma) \times [WBG(B/G)]^{\gamma} \quad \text{Equation (3)}$$

It goes without saying that amounts of noise can be calculated using imaging information other than color balance. Examples of imaging information are the characteristics of the image sensing device such as CCD 1, a shading characteristic, ISO sensitivity, γ characteristic, SR combining ratio, dynamic-range characteristic, automatic exposure amplifier for when a flash of light is emitted in a case where use is made of an electronic flash, shutter speed, EV value, LV value, number of recorded pixels, pixel mode, reproduction band, f-stop number, color difference matrix, lens disposition, zoom position, F-value and contour correction value, etc.

Figure 9:
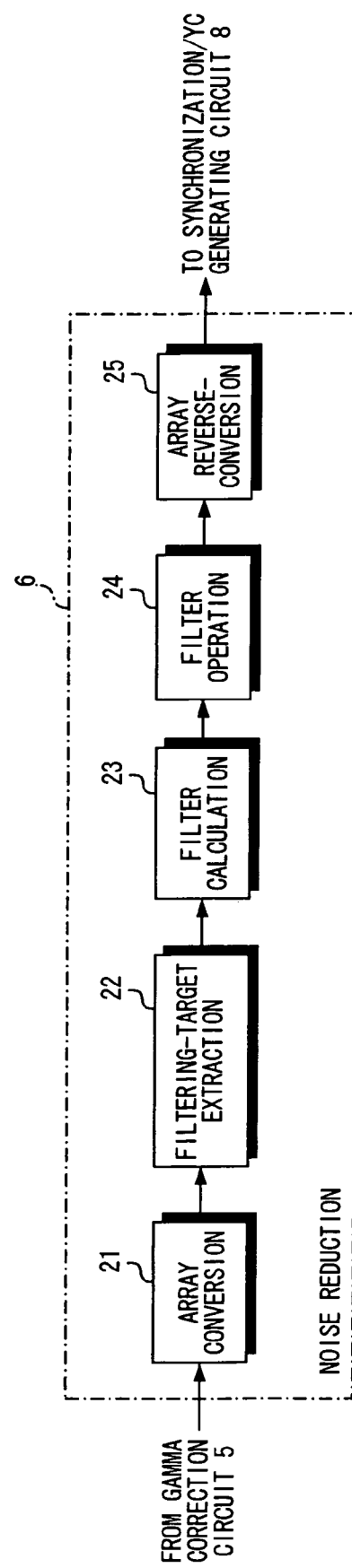
FIG. 9 is a block diagram illustrating the electrical structure of a noise reduction circuit.

FIG. 9 is a block diagram illustrating the electrical structure of the noise reduction circuit 6.

When the CCD-RAW data that has been output from the gamma correction circuit 5 enters the noise reduction circuit 6, the data is input to an array converting circuit 21. The array converting circuit 21 divides the CCD-RAW data, which is output in accordance with the color filter array (see FIG. 1) of CCD 1, on a per-color-component basis in the manner described above.

The CCD-RAW data that has been divided on a per-color-component basis in the array converting circuit 21 is input to a filtering-target extraction circuit 22. The latter extracts CCD-RAW data, which represents pixels in noise-reduction target areas each having five pixels in both the column and row directions (these areas are represented as the noise-reduction target areas AR, AB, AG1 and AG2 in FIG. 2), from the CCD-RAW data that has been divided on the per-color-component basis.

The CCD-RAW data to undergo filtering is input to a filter calculation circuit 23. The latter calculates a filter F in accordance with Equation (4) below.

$$F = \{D_{(s+n)} - \alpha D_n\} D_{(s+n)}^{-1} \quad \text{Equation (4)}$$

where $D_{(s+n)}$ in Equation (4) is a quantity that contains a signal and noise and is represented by Equation (5) below. Further, $\alpha$ is a filter control coefficient.

$$D_{(s+n)} = \begin{bmatrix} D_{(s+n)R} & D_{(s+n)RG1} & D_{(s+n)RB} & D_{(s+n)RG2} \\ D_{(s+n)G1R} & D_{(s+n)G1} & D_{(s+n)G1B} & D_{(s+n)G1G2} \\ D_{(s+n)BR} & D_{(s+n)BG1} & D_{(s+n)B} & D_{(s+n)BG2} \\ D_{(s+n)G2R} & D_{(s+n)G2G1} & D_{(s+n)G2B} & D_{(s+n)G2} \end{bmatrix} \quad \text{Equation (5)}$$

Here a diagonal component of $D_{(s+n)}$ is amount of variance of the signal of each color, and a non-diagonal component is amount of variance of a signal between colors. $D_{(s+n)x}$ (x=R, B, G1, G2) is represented by Equation (6) below, and the non-diagonal component $D_{(s+n)x1gx2}$ (x1, x2=R, B, G1, G2) is represented by Equation (7) below.

Further, Dn in Equation (1) is a quantity solely of noise and is represented by Equation (6) below.

$$D_n = \begin{bmatrix} D_{nR} & 0 & 0 & 0 \\ 0 & D_{nG1} & 0 & 0 \\ 0 & & D_{nB} & 0 \\ 0 & 0 & 0 & D_{nG2} \end{bmatrix} \quad \text{Equation (6)}$$

When the filter F is thus calculated, the calculated filter and the CCD-RAW data representing the pixels in the noise-reduction target area are input to a filter operation circuit 24. The latter performs a filter operation (noise reduction processing) that is based on Equation (7) below.

$$\begin{bmatrix} R_{out} \\ G1_{out} \\ B_{out} \\ G2_{out} \end{bmatrix} = F \begin{bmatrix} R_c - avR \\ G1_c - avG1 \\ B_c - avB \\ G2_c - avG2 \end{bmatrix} + \begin{bmatrix} avR \\ avG1 \\ avB \\ avG2 \end{bmatrix} \quad \text{Equation (7)}$$

In Equation (7), Rout, G1out, Bout and G2out indicate image data of the red color component, first green color component, blue color component and second green color component, respectively, obtained following the filter operation; Rc, G1c, Bc and G2c indicate image data representing noise-reduction target pixels present at the centers of the noise-reduction target areas AR, AG1, AB and AG2 of the red color component, first green color component, blue color component and second green color component, respectively, obtained by color-component division processing; and avR, avG1, avB and avG2 are items of data indicating average values of image data of pixels in the noise-reduction target areas AR, AG1, AB and AG2 of the red color component, first green color component, blue color component and second green color component, respectively, obtained by color-component division processing.

In Equation (7), the levels of image data of pixels in the noise-reduction target areas AR, AG1, AB and AG2 are shifted in the manner described above (see FIG. 5) to the origin position of the color space that has the red color component, first green color component, blue color component and second green color component as its coordinate system by subtracting the data avR, avG1, avB and avG2 indicating the average values of image data of pixels in the noise-reduction target areas AR, AG1, AB and AG2 of the red color component, first green color component, blue color component and second green color component, respectively, from the noise-reduction target pixels Rc, G1c, Bc and G2c present at the centers of the noise-reduction target areas AR, AG1, AB and AG2 of the red color component, first green color component, blue color component and second green color component that have been obtained by color-component division processing. The thus shifted pixels Rc, G1c, Bc and G2c to undergo noise reduction are subjected to filtering processing using the filter F indicated by Equation (4).

When $D_n$ indicated by Equation (6) is calculated from $D_{(s+n)}$ indicated by Equation (5) in the filtering processing using the filter F indicated by Equation (4), the uncorrelated noise of the CCD-RAW data is eliminated because the diagonal component of $D_{(s+n)}$ is subtracted, and the correlativity of the CCD-RAW data is maintained because the non-diagonal component is not subtracted. In other words, uncorrelated noise is removed while the correlativity of the CCD-RAW data is maintained.

By adding the data avR, avG1, avB and avG2 indicating the average values to the noise-reduction target pixels Rc, G1c, Bc and G2c obtained following filtering processing, the noise-reduction target pixels Rc, G1c, Bc and G2c are returned to levels corresponding to the original levels from which noise has been reduced.

In order to prevent parameters from becoming too large and, hence, degradation of the image following noise reduction processing in the above-described noise reduction processing, it is preferred that parameters Dgx and Dnx used in Equations (2) and (5) satisfy the relation of Equation (8) below. Here x=R, G1, B, G2 holds.

$$\text{if } D_{(s+n)} < Dn, \text{ then } D_{(s+n)} = D_n \quad \text{Equation (8)}$$

where X=R, G1, B, G2.

Such noise reduction processing is repeated with regard to one frame's worth of image data. Of course, if the level of color image data (the level of a pixel to undergo noise reduction) is equal to or greater than a predetermined level, noise reduction processing may be halted.

The image data that has undergone filter processing in the filter operation circuit 24 is input to an array reverse-conversion processing circuit 25. The array of image data that has been divided on a per-color-component basis is returned from the array of the color filters of CCD 1 to the original array of color filters of CCD 1 in the array reverse-conversion processing circuit 25. The output of the array reverse-conversion processing circuit 25 is the output of the noise reduction circuit 6.

Figure 10:
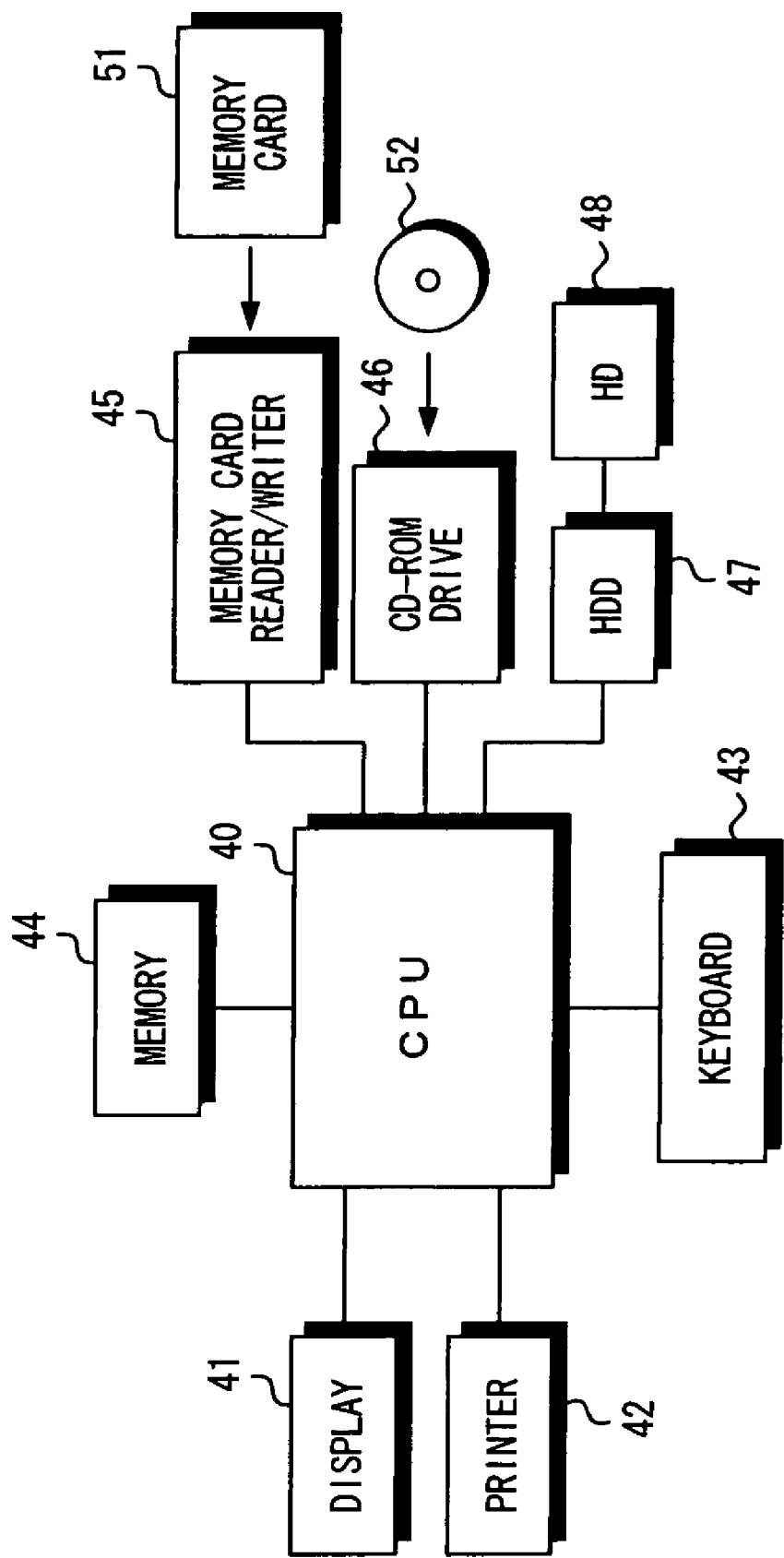
FIG. 10 is a block diagram illustrating the electrical structure of a computer system.

FIG. 10 is a block diagram illustrating the electrical structure of a computer system.

The above-described embodiment is such that noise reduction processing is executed in a digital still camera. However, noise reduction processing of CCD-RAW data can also be executed utilizing a computer system.

The computer system includes a CPU 40 to which have been connected a display unit 41, a printer 42, a keyboard 43 and a memory 44.

Also connected to the CPU 40 is a memory card reader/writer 45. By loading a memory card 51 on which CCD-RAW data has been recorded into the memory card reader/writer 45, the CCD-RAW data is read from the memory card 51 and the data is subjected to the above-described noise reduction processing. A CD-ROM drive 46 is further connected to the CPU 40. If a CD-ROM 52 on which a program for the above-described noise reduction processing has been stored is loaded into the CD-ROM drive 46, the noise reduction processing program will be read from the CD-ROM 52 and installed in the computer. Noise reduction processing can be applied to the CCD-RAW data that has been read from the memory card 51.

Further connected to the CPU 40 is a hard-disk drive 47. CCD-RAW data that has undergone noise reduction processing can be recorded on a hard disk 48 by the hard-disk drive 47.

Figure 11:
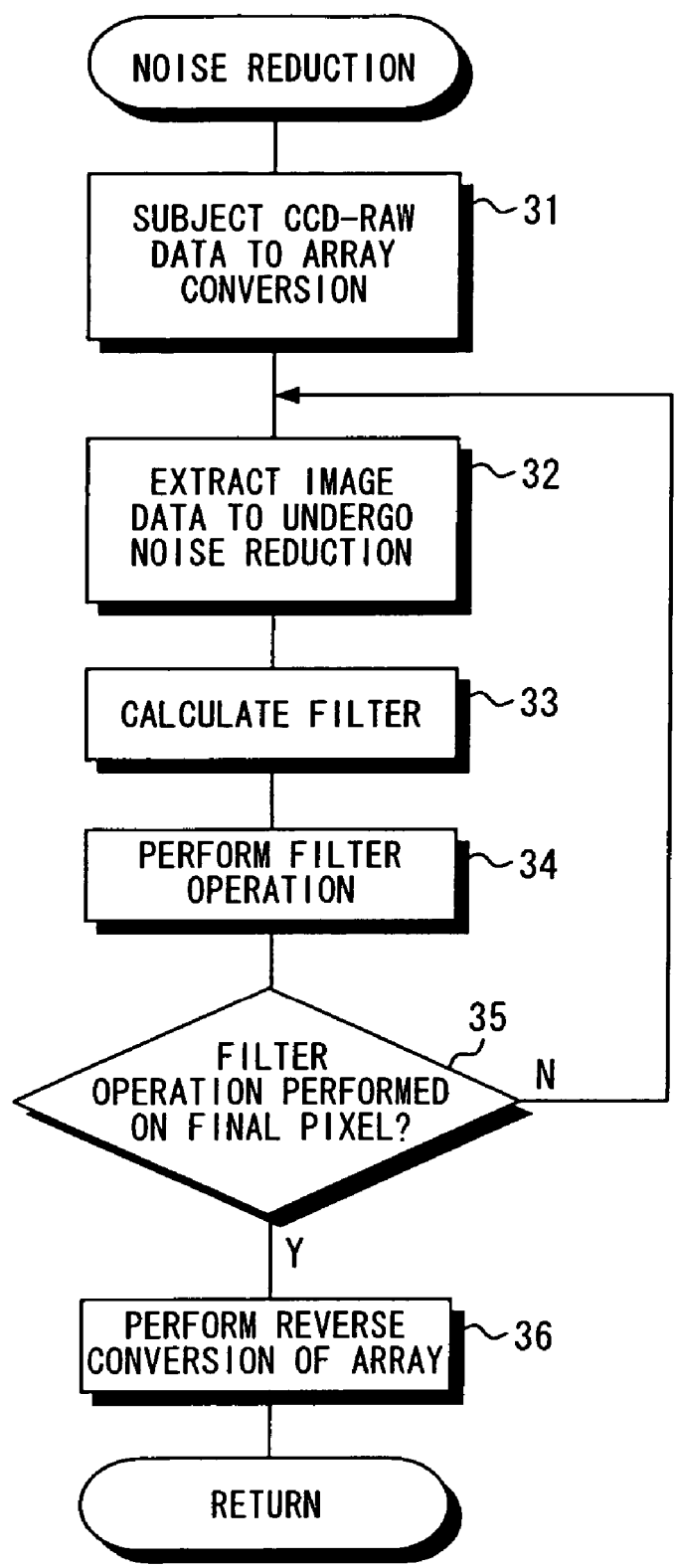
FIG. 11 is a flowchart illustrating noise reduction processing.

FIG. 11 is a flowchart illustrating noise reduction processing executed in the computer system.

As mentioned above, CCD-RAW data in which image data of color components that are in accordance with the color-filter array of CCD 1 appears is obtained from the memory card 51. This CCD-RAW data is subjected to array conversion processing (color-component division processing) in such a manner that the data will appear collectively on a per-color-component basis in the manner described above (step 31). When the array conversion processing is executed, image data to undergo noise reduction is extracted (step 32).

The filter F is calculated (step 33) and processing is executed using the filter F calculated (step 34). The processing from step 32 to step 34 is repeated until the filter operation has been applied to the final pixel of one frame of the image (step 35). This is followed by executing the above-described processing for reverse conversion of the array (step 36).

In the above-described embodiment, the filtering operation in noise reduction processing is performed using color components of four colors. However, a filter operation can also be performed using two colors×two color components. For example, an image can be divided into a set composed of a red color component and first green color component and a set composed of a blue color component and second green color component. A calculation indicated below can be performed with regard to the set composed of the red color component and first green color component. It goes without saying that a calculation can be performed in similar fashion with regard to the set composed of the blue color component and second green color component.

Equation (5) cited above is represented by Equation (9) below, and Equation (6) cited above is represented by Equation (10) below.

$$D_{(s+n)} = \begin{bmatrix} D_{(s+n)R} & D_{(s+n)RGI} \\ D_{(s+n)GIR} & D_{(s+n)GI} \end{bmatrix} \quad \text{Equation (9)}$$

$$D_n \begin{bmatrix} D_{nR} & 0 \\ 0 & D_{nGI} \end{bmatrix} \quad \text{Equation (10)}$$

Equation (7) cited above becomes Equation (11) when Equations (9) and (10) are used.

$$\begin{bmatrix} R_{out} \\ GI_{out} \end{bmatrix} = F \begin{bmatrix} R_c - avR \\ GI_c - avGI \end{bmatrix} + \begin{bmatrix} avR \\ avGI \end{bmatrix} \quad \text{Equation (11)}$$

Accordingly, in a case where an inverse matrix at the time of calculation of F is not found, it is preferred to so arrange it that noise reduction processing is not executed.

For example, in a case where a filter operation based upon Equation (4) is performed using Equation (9), $D_{(s+n)}^{-1}$ is represented by Equation (12) below.

$$D_{(s+n)}^{-1} = \frac{1}{AD - BC} \begin{bmatrix} D & -B \\ -C & A \end{bmatrix} \quad \text{Equation (12)}$$

where Equation (13) below is written for $D_{(s+n)}$ indicated by Equation (9).

$$D_{(s+n)} = \begin{bmatrix} D_{(s+n)R} & D_{(s+n)RGI} \\ D_{(s+n)GIR} & D_{(s+n)GI} \end{bmatrix} = \begin{bmatrix} A & B \\ C & D \end{bmatrix} \quad \text{Equation (13)}$$

Assume that $\Delta = AD - BC$ holds in Equation (12). If the value of $\Delta$ approaches zero, the image represented by image data that has undergone noise reduction processing will be degraded and therefore noise reduction processing is inhibited.

FIGS. 12 to 16 illustrate a modification of the embodiment.

Figure 12:
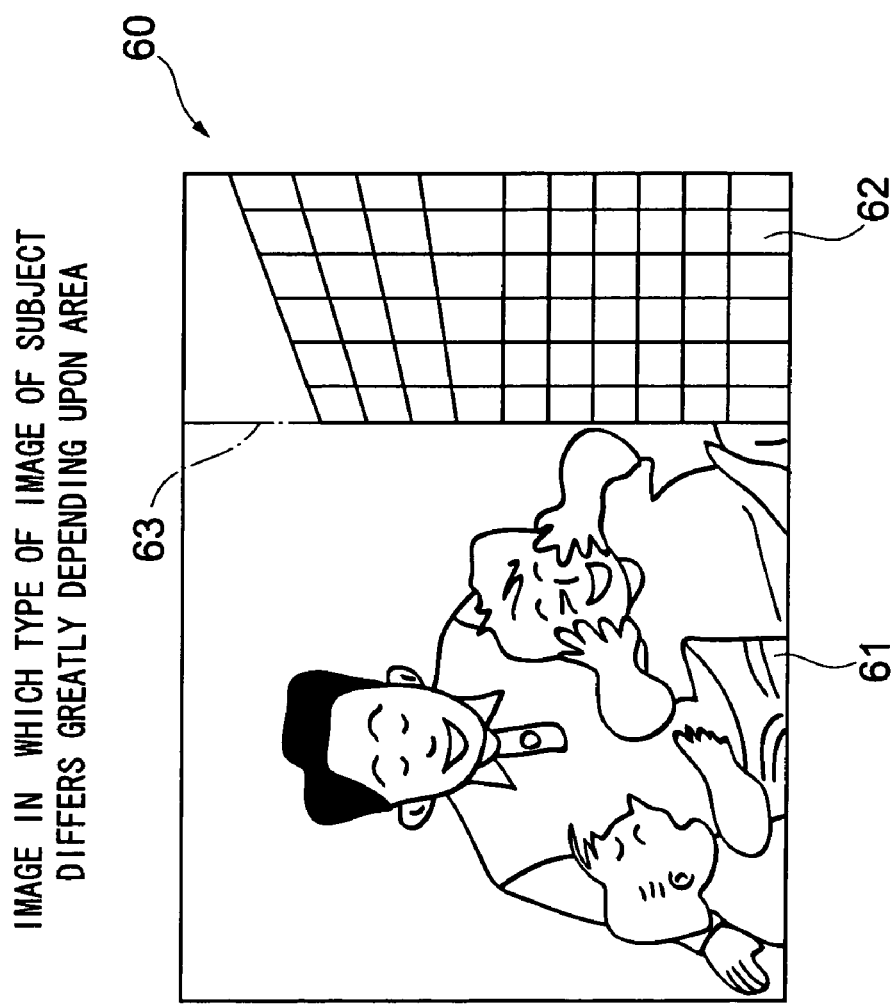
FIG. 12 illustrates an example of the image of a subject.

FIG. 12 illustrates an example of the image of a subject represented by CCD-RAW data.

Depending upon the camera angle, there are occasions where an edge 63 is produced in the image 60 of the subject. There are instances where correlativity vanishes between the level of the image data representing the image in an image area 61 on the left side of the edge 63 and the level of the image data representing the image in an image area 62 on the right side.

Figure 13:
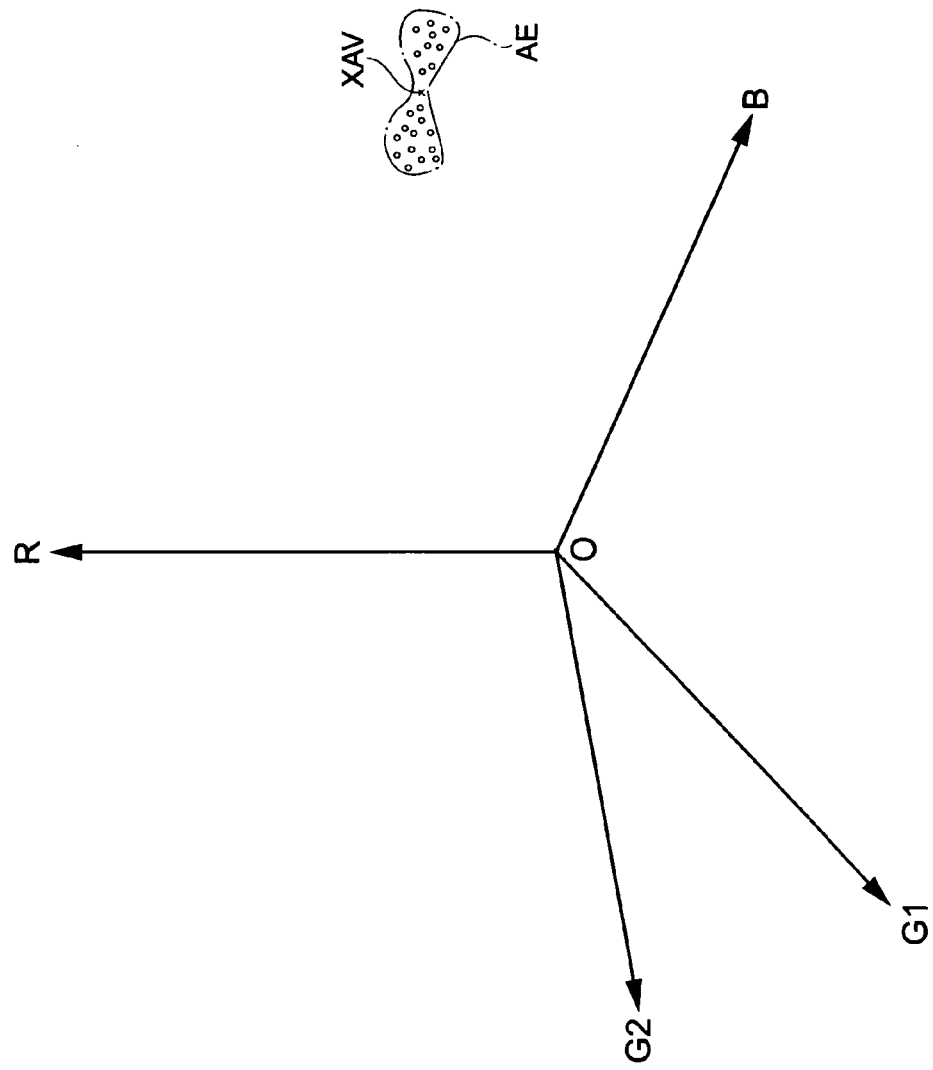
FIG. 13 illustrates the relationship between color space and image data.

FIG. 13 illustrates a level distribution of image data representing pixels within a noise-reduction target area in the color space of a red color component, blue color component, first green color component and second green color component.

If the edge 63 is produced in the image 60 of the subject and there is no image correlativity between the areas 61 and 62 on both sides of the edge 63, as shown in FIG. 12, the distribution of image data of pixels in a noise-reduction target area AE that includes the edge 63 becomes scattered in accordance with the position of a pixel on the image 60 of the subject in the noise-reduction target area without falling within fixed bounds centered on the average value XAV of image data representing pixels in the noise-reduction target area, as mentioned above. Consequently, even if the average value XAV is shifted to the origin in color space and filtering processing is executed in the manner described above, there are instances where the correlativity of pixels in the noise-reduction target area AE cannot be maintained.

Figure 14:
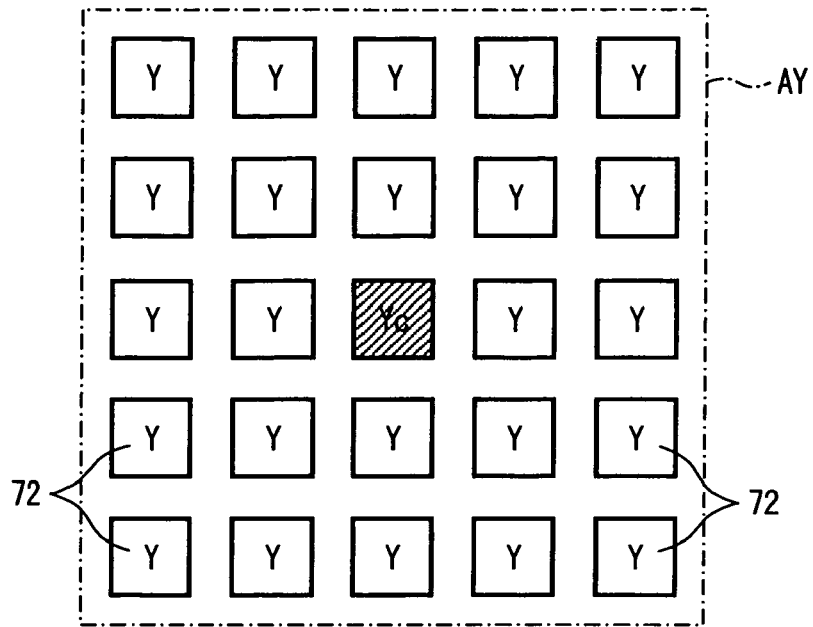
FIGS. 14 and 15 illustrate examples of areas to undergo noise reduction.

FIG. 14 illustrates an example of a noise-reduction target area AY.

In this modification, CCD-RAW data is converted to luminance data and the luminance data obtained by the conversion is used.

The noise-reduction target area AY contains a total of 25 pixels 72, namely five pixels in each of the column and row directions. A pixel Yc at the center of these pixels is a pixel to undergo noise reduction processing.

Figure 15:
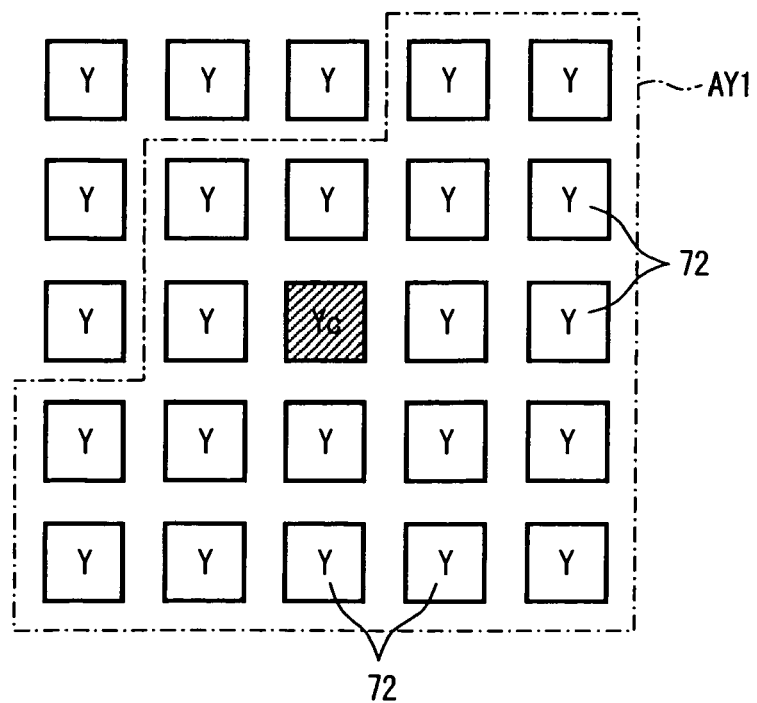

In a case where the noise-reduction target area AY involves the edge 63 in the manner described above, there are instances where noise reduction processing cannot be executed while correlativity between pixels is maintained. In this modification, therefore, as shown in FIG. 15, a noise-reduction target area AY1 exhibiting correlativity is detected anew and the above-described noise reduction processing is executed using the average value of pixels in the detected new noise-reduction target area AY1. Noise reduction processing can be executed while correlativity of pixels is maintained.

Figure 16:
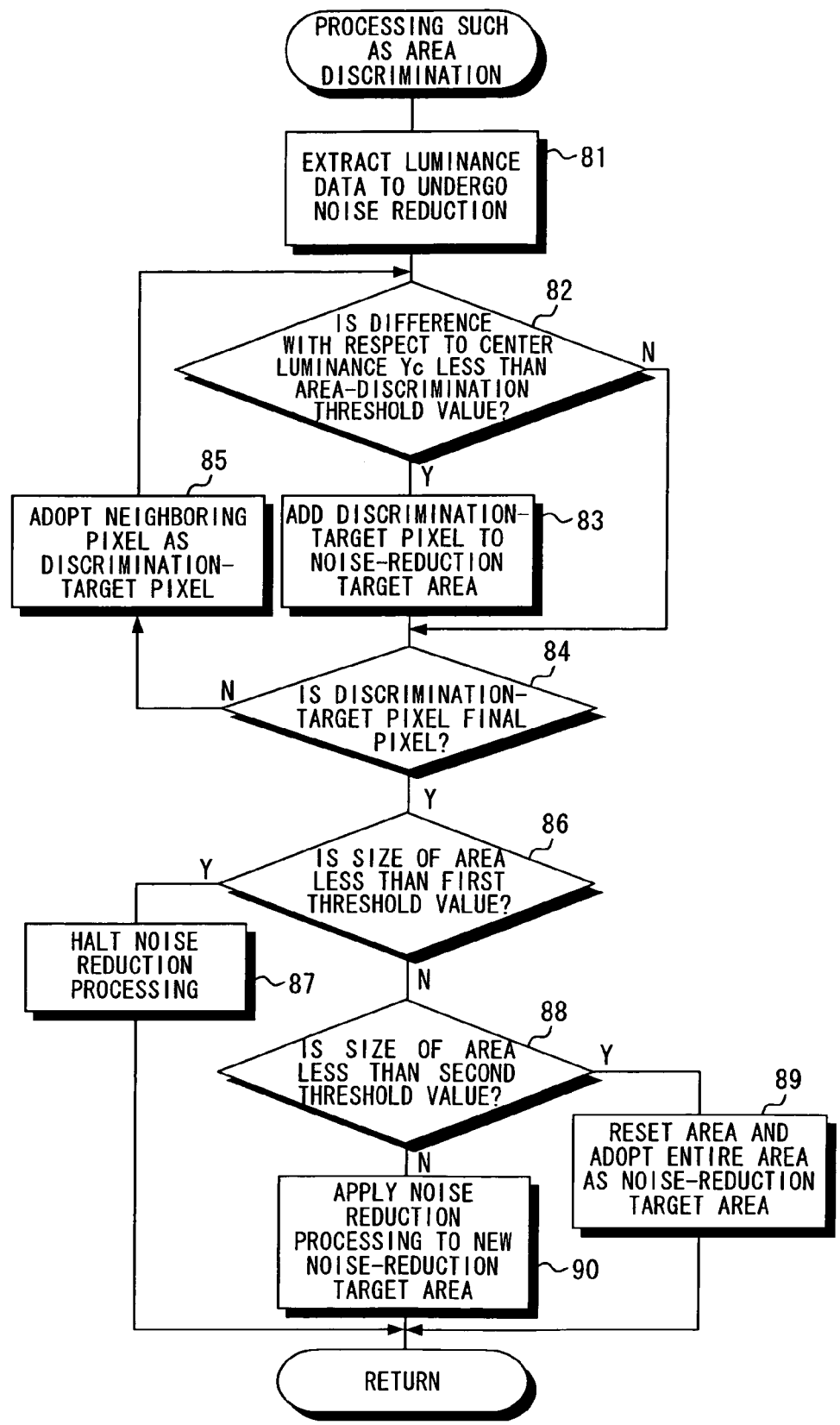

FIG. 16 is a flowchart illustrating processing for detecting a noise-reduction target area having correlativity.

Luminance data within a noise-reduction target area having five pixels in each of column and row directions is generated from CCD-RAW data (step 81; see FIG. 14). It is determined whether the difference between the level of image data of one pixel (a pixel to undergo discrimination) within the noise-reduction target area and the level of image data of the pixel Yc at the center is less than a predetermined area-discrimination threshold value (step 82). If the difference is less than the threshold value ("YES" at step 82), then it is construed that this one pixel has correlativity with respect to the center pixel Yc. Accordingly, this one pixel, which is the pixel undergoing discrimination, is added to a new noise-reduction target area (step 83). If the difference is equal to or greater than the threshold value ("NO" at step 82), then it is construed that this one pixel does not have correlativity with respect to the center pixel. This pixel, therefore, is not added to the new noise-reduction target area. The above-described processing of steps 82 and 83 is repeated with regard to all pixels to undergo discrimination (step 84). If the pixel processed is not the final pixel ("NO" at step 84), then a pixel neighboring (e.g., on the right side) the one pixel is set as a new pixel to undergo discrimination (step 85).

If the above-described processing of steps 82 and 83 has been completed for all pixels ("YES" at step 84), then the new noise-reduction target area AY1 is decided as illustrated in FIG. 15.

The method of processing changes further in accordance with the size of the new noise-reduction target area AY1 thus decided.

In a case where the size of the new noise-reduction target area AY1 is very small and is less than a first threshold value ("YES" at step 86), the number of pixels within the noise-reduction target area will be too small and there are instances where comparatively appropriate noise reduction processing cannot be executed. As a result, noise reduction processing is halted (step 87).

If the size of the noise-reduction target area AY1 is greater than the first threshold value ("NO" at step 86) but is comparatively small and therefore smaller than a second threshold value (first threshold value>second threshold value) ("YES" at step 88), then, in order to enlarge the number of pixels in the noise-reduction target area, noise reduction processing is not executed using the new noise-reduction target area AY1 but is executed using a noise-reduction target area of a prescribed size (step 89).

If the size of the new noise-reduction target area AY1 is greater than the second threshold value ("NO" at step 88), then it is construed that the noise-reduction target area of the prescribed size contains an edge portion or the like. In order to eliminate the edge portion, noise reduction processing is executed using the new noise-reduction target area AY1 (step 90).

The above-described processing for deciding a new noise-reduction target area performs discrimination one pixel at a time. However, it may be so arranged that the decision is rendered for every block of a plurality of pixels.

Figure 17:
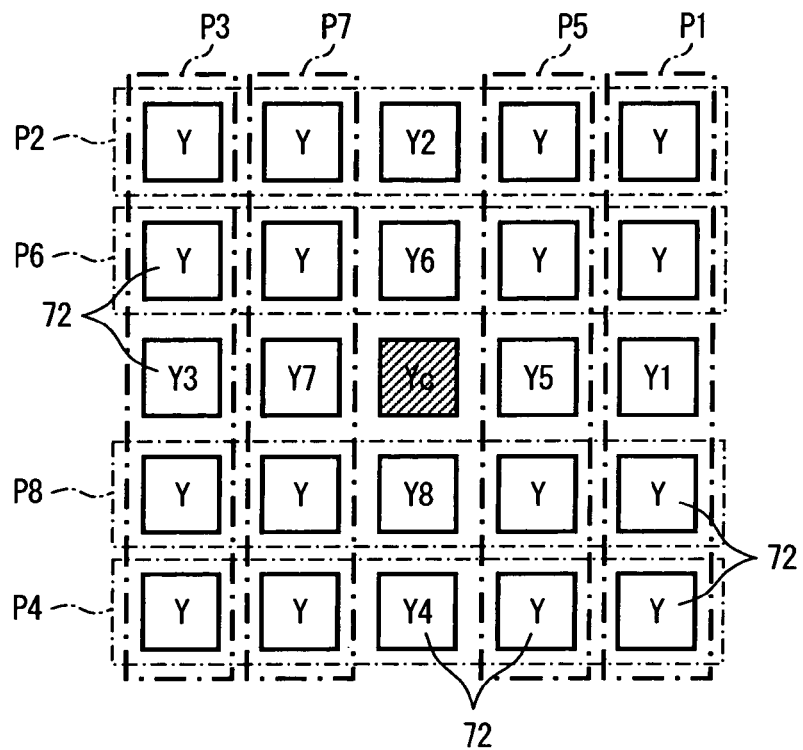
FIGS. 17 and 18 illustrate examples of areas to undergo noise reduction.

FIG. 17 illustrates an example of a noise-reduction target area.

As shown in FIG. 17, pixels in a noise-reduction target area are divided into individual blocks of every row and column with the exception of the row and column that contain the center pixel Yc. That is, in the row direction, the pixels are divided into small blocks P2, P6, P8 and P4 of a first row, second row, fourth row (the third row is excluded because it contains the center pixel Yc) and fifth row, respectively. In the column direction, the pixels are divided into small blocks P3, P7, P5 and P1 of a first column, second column, fourth column (the third column is excluded because it contains the center pixel Yc) and fifth column, respectively.

Among the pixels constituting each small block, the center pixel is adopted as the representative pixel of this small block. The representative pixels of the small blocks P2, P6, P8 and P4 of the first, second, fourth and fifth rows, respectively, are Y2, Y6, Y8 and Y4, respectively. The representative pixels of the small blocks P3, P7, P5 and P1 of the first, second, fourth and fifth columns, respectively, are Y3, Y7, Y5 and Y1, respectively.

It is determined whether the difference between the level of the representative pixel of each block and the level of the center pixel Yc is less than the area-discrimination threshold value, as mentioned above. If the difference is less than the threshold value, then the entirety of the small block that contains this representative pixel is added to the new noise-reduction target area.

Figure 18:
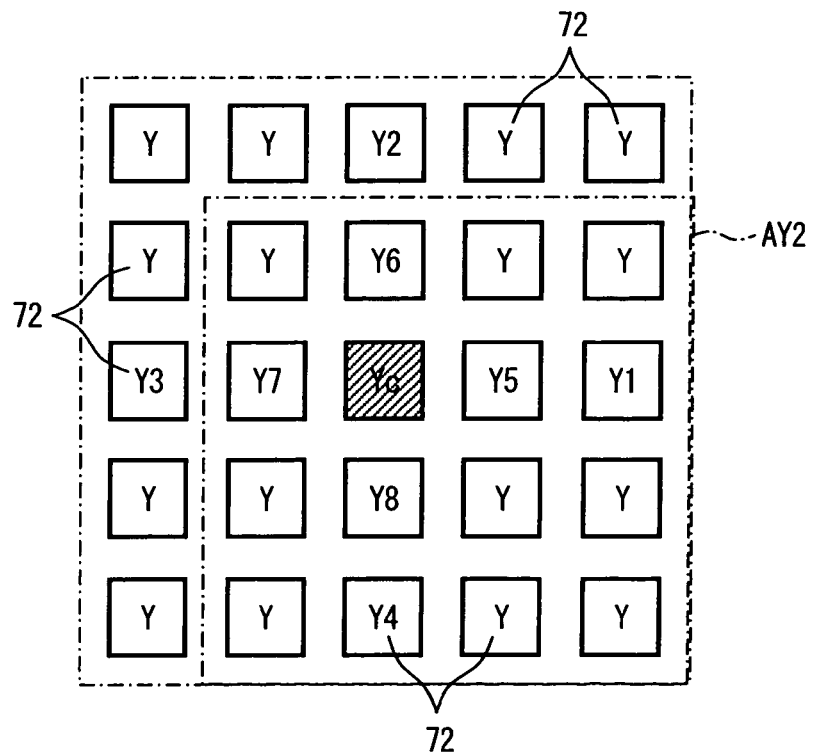

FIG. 18 illustrates an example of a noise-reduction target area decided anew.

Pixels of the first row and first column have been excluded from a noise-reduction target area AY2 decided anew. The reason for this is that with regard to the representative pixels Y2 and Y3, the level difference with respect to the center pixel Yc has been determined to be equal to or greater than the predetermined area-discrimination threshold value. With regard to the representative pixels Y6, Y8, Y4, Y7, Y5 and Y1 of the small blocks of the other rows and columns, the level difference relative to the center pixel is less than the predetermined area-discrimination value and therefore the pixels contained in each of these small blocks are contained in the noise-reduction target area AY2.

Thus, processing is simplified by discriminating a noise-reduction target area on a per-small-block basis.

Figure 19:
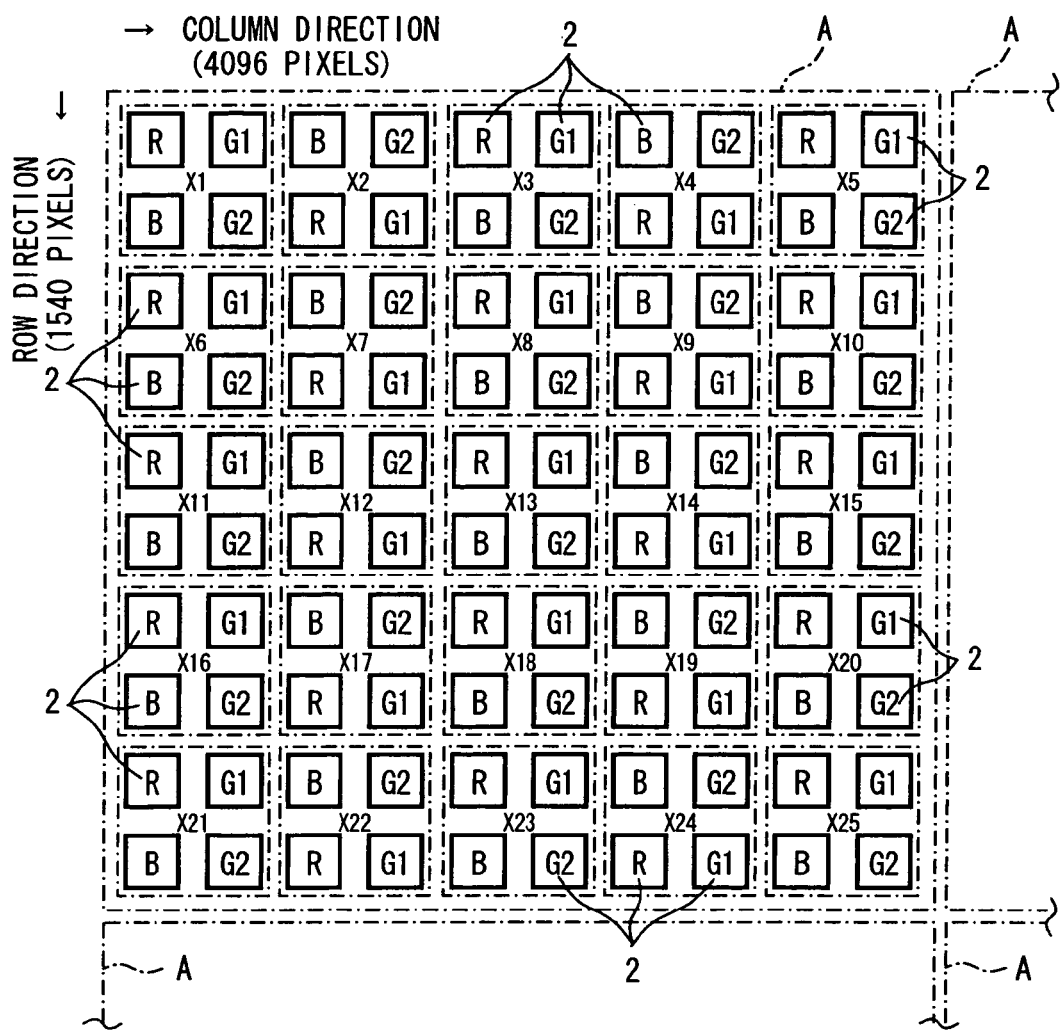
FIGS. 19 and 20 illustrate part of the photoreceptor surface of a CCD.
Figure 20:
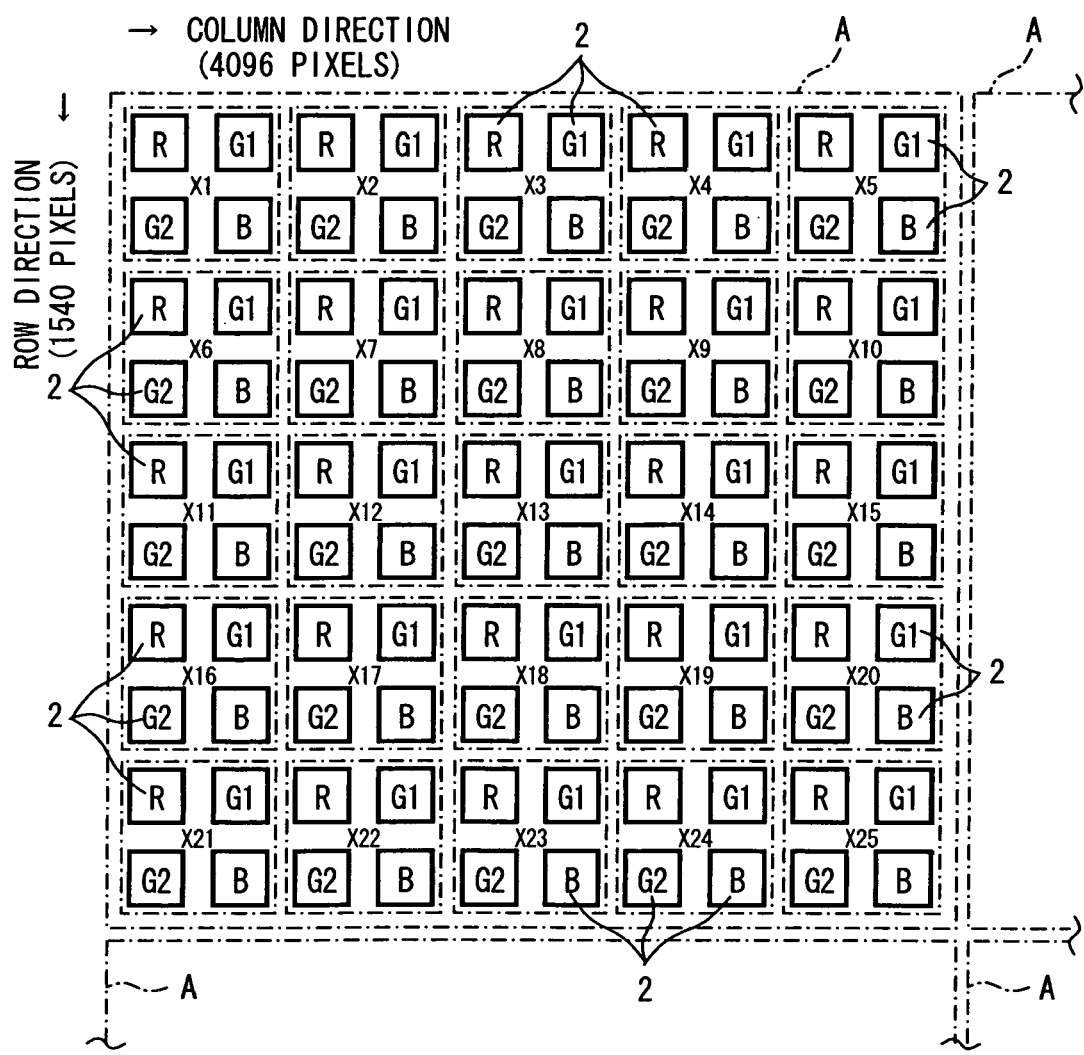

It goes without saying that the embodiment of the present invention is not limited to the above-described filter array and can be applied to any filter array. For example, as shown in FIG. 19, the embodiment is also applicable to a so-called honeycomb array in which a (4n+1)th column, (4n+2)th column, (4n+3)th column and (4n+4)th column are provided in odd-numbered rows with filters having characteristics that pass the red color component, first green color component, blue color component and second green color component, respectively, and the (4n+1)th column, (4n+2)th column, (4n+3)th column and (4n+4)th column are provided in even-numbered rows with filters having characteristics that pass the blue color component, second green color component, red color component and first green color component, respectively. Further, as shown in FIG. 20, the embodiment is also applicable to a so-called Bayer array in which odd-numbered rows and odd-numbered columns are provided with filters having a characteristic that passes the red color component, odd-numbered rows and even-numbered columns are provided with filters having a characteristic that passes the first green color component, even-numbered rows and odd-numbered columns are provided with filters having a characteristic that passes the second green color component, and even-numbered rows and even-numbered columns are provided with filters having a characteristic that passes the blue color component. Thus, this embodiment is applicable if the array of color filters is systematic.

As many apparently widely different embodiments of the present invention can be made without departing from the spirit and scope thereof, it is to be understood that the invention is not limited to the specific embodiments thereof except as defined in the appended claims.

What is claimed is:

1. A noise reduction apparatus comprising:
a color-component extraction device for inputting image data representing an image in which each pixel of a number of pixels constituting one frame of an image has one color component from among a plurality of color components, the color components having a distribution that is systematic, and extracting, on a per-color-component basis, color image data representing a pixel within a zone in which the color image data is regarded as having correlativity;
a noise removal device for removing uncorrelated noise, which is contained in the color image data that has been extracted on a per-color-component basis, while maintaining correlativity of the color image data that has been extracted by said color-component extraction device on a per-color-component basis; and
a control device for exercising control in such a manner that color-component extraction processing by said color-component extraction device and noise removal processing by said noise removal device is repeated with regard to the one frame of color image data.

2. The apparatus according to claim 1, further comprising a noise removal processing inhibiting device for inhibiting noise removal processing by said noise removal device in accordance with level of the color image data.

3. The apparatus according to claim 1, wherein said color-component extraction device inputs color image data that is output from a single-chip solid-state electronic image sensing device in which a number of optoelectronic transducers are arrayed, color filters each having a characteristic that passes light of one color component from among the plurality of color components being formed systematically, for each of the plurality of colors, on photoreceptor surfaces of respective ones of the optoelectronic transducers of said number of optoelectronic transducers.

4. The apparatus according to claim 3, wherein processing for removing uncorrelated noise in said noise removal device is executed based upon the characteristic of the solid-state electronic image sensing device and at least one item of shooting information used when a picture has been taken using said solid-state electronic image sensing device.

5. The apparatus according to claim 1, wherein said noise removal device includes:
a color image data shifting device for shifting the level of the color image data, which has been extracted by said color-component extraction device, in such a manner that an average value of the levels of the color image data that has been extracted by said color-component extraction device will become an origin position of color space of the plurality of color components;
a filtering device for subjecting the color image data that has been shifted by said color image data shifting device to processing for removing uncorrelated noise in accordance with the level of this color image data; and
a color image data reverse shifting device for returning, in accordance with the amount of shift, the level of the color image data from which the uncorrelated noise has been removed by said filtering device.

6. The apparatus according to claim 5, wherein the noise reduction processing in said filtering device is digital filtering processing that utilizes calculation conforming to the number of the plurality of color components.

7. The apparatus according to claim 5, wherein the noise reduction processing in said filtering device is digital filtering processing for handling the plurality of color components in such manner that the number of the plurality of color components will become less than the number of original color components, this processing utilizing calculation conforming to the number of the plurality of color components.

8. The apparatus according to claim 7, further comprising a noise reduction processing halting device for halting noise reduction processing in a case where calculation in the digital filtering processing has diverged.

9. The apparatus according to claim 5, wherein digital filtering processing applied to the shifted color image data in said filtering device uses processing that subtracts uncorrelated noise from image data in an area that contains uncorrelated noise.

10. The apparatus according to claim 5, further comprising an image data dividing device for dividing the entirety of the color image data that has been extracted by said color-component extraction device into a plurality of color image data groups exhibiting correlativity with one another;
wherein said color image data shifting device performs the shift with regard to a color image data group, which contains color image data that is to undergo removal of uncorrelated noise, from among the plurality of color image data groups obtained by division by said image data dividing device, in such a manner that this color image data group will occupy the origin position of the color space of the plurality of color components.

11. The apparatus according to claim 10, wherein said image data dividing device includes a small-block dividing device for dividing color image data that has been extracted by said color-component extraction device into a plurality of small blocks;
wherein the color image data is divided into a plurality of correlated color image data groups per each of the plurality of small blocks obtained by division by said small-block dividing device.

12. The apparatus according to claim 11, wherein the color image data is divided into a plurality of correlated color image data groups per each of the plurality of small blocks based upon representative pixels that constitute the small blocks.

13. The apparatus according to claim 10, further comprising an uncorrelated noise halting control device for halting processing for removing uncorrelated noise by said noise removing device in a case where the size of an image area represented by the plurality of color image data groups obtained by division by said image data dividing device is less than a first predetermined value.

14. The apparatus according to claim 10, wherein in a case where the size of an image area represented by the plurality of color image data groups is equal to or greater than a second predetermined value larger the first predetermined value, the shift is performed with regard to a color image data group, which contains color image data that is to undergo removal of uncorrelated noise, from among the plurality of color image data groups obtained by division by said image data dividing device.

15. The apparatus according to claim 10, further comprising a luminance data generating device for generating luminance data from the color image data that has been extracted by said color-component extraction device;
wherein said image data dividing device divides the color image data into a plurality of luminance data groups, which exhibit correlativity with one another, from among the luminance data that has been generated by said luminance data generating device.

16. A method of reducing noise, comprising the steps of:
inputting image data representing an image in which each pixel of a number of pixels constituting one frame of an image has one color component from among a plurality of color components, the color components having a distribution that is systematic, and extracting, on a per-color-component basis, color image data representing a pixel within a zone regarded as having correlativity;

removing uncorrelated noise, which is contained in the color image data that has been extracted on a per-color-component basis, while maintaining correlativity of the color image data that has been extracted on a per-color-component basis; and repeating the color-component extraction processing and noise removal processing with regard to the one frame of color image data.

17. A computer-readable medium containing a noise reduction program for controlling a computer so as to implement the following steps:

inputting image data representing an image in which each pixel of a number of pixels constituting one frame of an image has one color component from among a plurality of color components, the color components having a distribution that is systematic, and extracting, on a per-color-component basis, color image data representing a pixel within a zone regarded as having correlativity;

removing uncorrelated noise, which is contained in the color image data that has been extracted on a per-color-component basis, while maintaining correlativity of the color image data that has been extracted on a per-color-component basis; and repeating the color-component extraction processing and noise removal processing with regard to the one frame of color image data.

* * * * *